United States Patent Office 3,157,607
Patented Nov. 17, 1964

3,157,607
CURABLE COMPOSITION COMPRISING AN ADMIXTURE OF POLYESTER POLYMER, A POLYMERIC POLYMER, AND A POLYALKYLENEAMIDE POLYMER
Murray I. Bassin, Los Angeles, Calif., assignor to Minnesota Mining and Manufacturing Company, St. Paul, Minn., a corporation of Delaware
No Drawing. Filed Jan. 7, 1960, Ser. No. 952
1 Claim. (Cl. 260—22)

This invention relates to a curable composition. In one aspect this invention relates to a flowable composition which can be cured or vulcanized to form a solid, tough mass. In still another aspect this invention relates to a room temperature curable composition which may be applied in liquid or fluid form to the surface or contour and thereafter cured to produce a solid material useful as an adhesive, sealant, or coating.

Compositions and polymers which can be applied or fabricated in liquid or flowable form and then cured to a solid, rigid material of the desired shape or to the desired application have been known in the art. However, these compositions have many drawbacks in that they have only limited use under the environmental conditions to which they are subjected.

It is the purpose of this invention to provide such a curable composition which can be applied in liquid or flowable form or fabricated in such form but which is highly thermally stable and chemically resistant.

It is an object of this invention to provide a new composition which can be cured or cross-linked to produce a mass of increased viscosity.

Another object is to provide a new and useful cured composition having good hydrolytic properties.

Still another object of this invention is to provide a curable composition which can be applied to the surface or fabricated in normally liquid or flowable form.

Another object of this invention is to provide a curable composition which in its cured state is solvent resistant and heat stable.

Another object of this invention is to provide a sealant which can be applied in a flowable form and cured in situ.

Still another object of this invention is to provide an adhesive composition which is curable at relatively low temperatures.

Another object is to provide a new curing process.

Various other objects and advantages will become apparent to those skilled in the art from the accompanying description and disclosure.

According to this invention, the curable composition comprises a low molecular weight polyester polymer containing an active hydrogen, such as a carboxyl or hydroxyl group or groups, admixed with a low molecular weight copolymer of a polyene fatty acid and a polyfunctional amine. The composition is usually in liquid form under ambient conditions; and if not, may be liquefied or made flowable by heating to a temperature not higher than about 100° C., or by dissolving the composition in a solvent. Preferably, the quantity of low molecular weight copolymer of the polyene fatty acid and polyfunctional amine is between about 0.5 and about 10 parts by weight per 100 parts by weight of the polyester polymer. This composition is then applied to the surface or is fabricated, such as by injecting the composition into a mold cavity, and thereafter is cured to form a solid elastomer with a polyalkylenamide as a curing or cross-linking agent. The curable composition is maintained separate in most instances from the cross-linking or curing agent until the composition is ready to be utilized. At this time, the curing agent is admixed with the curable composition and the resulting admixture applied to the surface, cavity or mold and allowed to cure, usually at room temperature. Temperatures up to 100° C. may be utilized for curing the polymer, if desired. Room temperature cures may be effected in some instances in a matter of hours, such as twenty-four hours. Higher temperature cures are usually effected in a much shorter time, usually a period of several minutes to several hours. The cured elastomer is useful as a sealant or as an adhesive, or as a protective coating for various surfaces, such as metals, fabrics, or rubbers.

The preferred curable polyesters are the carboxyl- and hydroxyl-containing polyester polymers, preferably having a molecular weight between about 1,000 and about 5,000, in particular the carboxyl-containing polyester polymers.

Polyester polymers can be prepared from a polyfunctional alcohol containing three or more hydroxyl groups, one or more diols and one or more dibasic acids by interaction at elevated temperatures, such as 150 to 200° C., in the absence or presence of an esterification catalyst, preferably an acidic catalyst. Some examples of these polyester polymers are the polymerization products of glycerol, 2,2-dimethyl-1,3-propanediol and succinic acid; trimethylolpropane, diethylene glycol, and adipic acid; trimethylolpropane, neopentyl glycol and diglycolic acid; glycerol, diethylene glycol, and adipic acid; trimethylolpropane, polyethylene glycol and thiadipropionic acid; trimethylolethane, diethylene glycol, polyethylene glycol and oxydipropionic acid; trimethylolpropane, 2,2-bis [4-(2-hydroxypropoxy)phenyl]-propane and azelaic acid; mannitol diethylene glycol and diglycolic acid; pentaerythritol, propylene glycol, sebacic acid, and isophthalic acid; and trimethylolpropane, 3-methyl-3-azapentandiol-1,5 and azelaic acid.

Polyester polymers can be prepared from a polyfunctional acid containing three or more acid groups, one or more diols and one or more dibasic acids by interaction under the conditions mentioned above. Some examples of these polyesters are the polymerization products of trimesic acid, diethylene glycol and adipic acid; citric acid, polyethylene glycol and adipic acid; citric acid, di-1,4-(2-hydroxypropoxy) benzene, fumaric acid and sebacic acid; benzene tetracarboxylic acid, propylene glycol, 1,4-butylene glycol and adipic acid; benzene tetracarboxylic acid; polyethylene glycol, and maleic acid; and benzene tetracarboxylic acid; 2,2-diethyl 1,3-propanediol, and diglycolic acid.

Polyester polymers can also be similarly prepared by reacting a polyfunctional acid containing three or more acid groups with a hydroxy or an amino acid. Some examples of such polyesters are the polymerization products of benzene tetracarboxylic acid and 12-hydroxy stearic acid; benzene tetracarboxylic acid and N-methyl β-alanine; polyacrylic acid and hydroacrylic acid; polyacrylic acid and N-methyl-omega-aminoundecanoic acid; polymethacrylic acid and N-methyl-6-amino caproic acid.

As dianhydride-extended polyesters, some examples are the reaction products of a linear, hydroxyl-terminated polydiethylene glycol adipate extended with pyromellitic dianhydride; a linear, hydroxyl-terminated polyester of 1,4-butylene glycol and diglycolic acid extended with 1,4,5,8-naphthalenetetracarboxylic dianhydride; and a linear, hydroxyl-terminated polyester of polypropylene glycol and isophthalic acid extended with cyclohexanetetracarboxylic dianhydride. The conditions of reaction are similar to the above but the catalyst may be omitted in some instances.

Other polyesters are the anhydride-extended polyether glycols prepared as above. Some examples are the reaction products of dianhydrides with polyether glycols such as pyromellitic dianhydride and polybutylene glycol; 1,4,5,8-naphthalenetetracarboxylic dianhydride and polypropylene glycol; and cyclohexanetetracarboxylic dianhydride and poly 3-methyl-1,4-butylene glycol.

For carboxyl-containing polyester polymers, an excess of the carboxyl-containing reactant is used while for hydroxyl-containing polyester polymers, an excess of the hydroxyl-containing reactant is used. These excesses are based on the ratio of the total number of hydroxyl groups and carboxyl groups.

The low molecular weight polymer of a fatty acid and a polyamine is prepared by reacting a low molecular weight polymer of a polyene fatty acid with a polyfunctional amine to form higher molecular weight material which contains an aliphatic amine and amide functional groups. A postulated structure for a product of this type (the reaction product of the dimer of linoleic acid and ethylene diamine) is as follows:

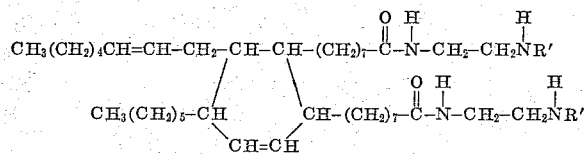

wherein R' is hydrogen or another linoleic acid dimer group. When a dimer of a fatty acid, e.g., of linoleic acid, is condensed with a diamine, solid, thermoplastic materials usually result while if a polyamine containing three or more amino groups is used in place of the diamine, soft or liquid materials usually result. Resins of this general type are disclosed in United States Patent No. 2,450,940. Amine-terminated polyamides of this type, which will also be referred to as aliphatic polyfunctional amines, are available from General Mills, Inc. of Kankakee, Illinois, under the registered trademark "Versamid." Among these products, which are produced by the condensation of polycarboxylic acids with polyamines, are "Versamid" 100, a soft, tacky resin that is semi-solid at room temperature, which melts at 43–53° C. and which has an amine value of 83–93; "Versamid" 115, a viscous liquid resin at room temperature which has a viscosity at 40° C. of approximately 500–750 poises (on a Brookfield Viscometer using a No. 6 Spindle and revolving at 4 r.p.m.) and an amine value of 210–230; "Versamid" 125, a fluid resin at room temperature which is reported to have a viscosity at 40° C. of approximately 80–120 poises (on a Brookfield Viscometer using a No. 6 Spindle and revolving at 4 r.p.m.) and an amine value of 290–320; and "Versamid" 140, derived from dimeric or trimeric polyene higher fatty acids and triethylenetetramine of the type described hereinabove, which is a liquid at room temperature which has a viscosity at 25° C. of approximately 125–175 poises (on a Brookfield Viscometer using a No. 6 Spindle and revolving at 4 r.p.m.), an amine value of approximately 350–400 and a molecular of 680 to 700.

Aliphatic polyfunctional amines which contain no amide groups may be prepared from the polymerized polyene fatty acids, for example, by dehydration of the ammonium salt of the acid followed by hydrogenation of the resulting amide, during which the residual unsaturation may be partly or wholly removed. A postulated structure for a product of this reaction is exemplified by the following:

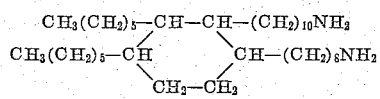

Aliphatic polyfunctional amines of this type, which can be obtained from Emery Industries, Inc. of Cincinnati, Ohio, are "Emery 3154–R" amine, a liquid resin at room temperature which has an amine value of approximately 177; and "Emery 654–27–R" amine, which is also liquid at room temperature and which has an amine value of approximately 155. These and the above polyfunctional amines derived from low molecular weight polymers of higher fatty acids and the above amide-containing polyfunctional amines can be referred to generically as polyamine polymers having molecular weights generally between about 500 and about 15,000.

The easily available aliphatic amide-containing polyfunctional amines which contain relatively low concentrations of amine functional groups, e.g., the "Versamid" and "Emery Amine" products which are substantially liquid, that is, liquid or semi-solid at ordinary temperatures, lend themselves to easy mixing with the curing agents, particularly when the latter are also liquid under ambient conditions. Mixtures of the amide-containing polyfunctional amines may be used if properties intermediate of two of them are desired, and in fact the commercially available products are themselves often mixtures and commonly may contain a small amount of unpolymerized material, but this does not destroy their utility for use in the present invention.

The polyalkylenamides of this invention which are suitable as cross-linking agents may, in their preferred form, be represented by the following formula:

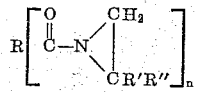

wherein R is an $n$-valent organic radical, preferably a hydrocarbon radical, having 4 to about 55 carbon atoms, such as an acyclic alkylene radical, or an arylene radical (for example, the 1,3-phenylene radical and the 1,4-phenylene radical, or an aryline radical, such as 1,3,5-phenyline radical; and R' and R" each represent hydrogen or a substituted or non-substituted alkyl radical having from 1 to 8 carbon atoms; and $n$ is 2 to 4, preferably 2 to 3.

Among the N,N'-bis-1,2-alkylenamides useful as curing agents in accordance with the invention are N,N'-bis-ethylenadipamide;
N,N'-bis-ethylenisosebacamide;
N,N'-bis-1,2-butylenisosebacamide;
N,N'-bis-ethylensebacamide;
N,N'-bis-ethylensuberamide;
N,N'-bis-1,2-propylensuberamide;
N,N'-bis-1,2-butylensuberamide;
N,N'-bis-ethylenazelaamide;
N,N'-bis-1,2-propylenazelaamide;
N,N'-bis-1,2-butylenazelaamide;
N,N'-bis-ethylendodecanoyldicarboxylic acid amide;
N,N'-bis-ethylenetetradecanoyldicarboxylic acid amide;
N,N'-bis-1,2-propylenetetradecanoyldicarboxylic acid amide;
N,N'-bis-ethylenehexadecanoyldicarboxylic acid amide;
N,N'-bis-ethylenoctadecanoyldicarboxylic acid amide;
N,N'-bis-1,2-propylenoctadecanoyldicarboxylic acid amide;
N,N'-bis-1,2-propylenedodecanoyldicarboxylic acid amide; and
N,N'-bis-1,2-pentylensebacamide;
N,N'-bis-1,2-butylenisophthalamide;
N,N'-bis-1,2-propylenisophthalamide;

N,N'-bis-1,2-pentylenisophthalamide;
N,N'-bis-ethyleneterephthalamide;
N,N'-bis-1,2-propyleneterephthalamide;
N,N'-bis-1,2-butyleneterephthalamide; etc.

Mixtures of these monomers may be produced by employing mixed 1,2-alkylenimines in producing the monomers of the invention in accordance with the process of the invention.

The N,N'-bis-1,2-alkylenamide curing agents are prepared in monomeric form by the following two phase process: an aqueous solution of an 1,2-alkylenimine, desirably containing not more than 10 carbon atoms, such as ethylenimine, 1,2-propylenimine, 1,2-butylenimine, 1,2-pentylenimine, etc., is reacted in the presence of an organic solvent at a temperature between about —5 and about 30° C. with an aliphatic dicarboxylic acid chloride containing 6 to 50 carbon atoms, such as adipoyl dichloride, isosebacoyl dichloride, sebacoyl dichloride, suberoyl dichloride, azelaoyl dichloride, tetradecanoyl dichloride, dodecanoyl dichloride, hexadecanoyl dichloride and octadecanoyl dichloride, isophthaloyl chloride and terephthaloyl dichloride; to produce the desired substantially pure N,N'-bis-1,2-alkylenamide monomer, with hydrogen chloride as a by-product. The 1,2-alkylenimine is employed in a ratio of about 2 moles for each mol of acid chloride. Advantageously, an excess of 1,2-alkylenimine, such as about 5 percent by weight, over and above this ratio may be employed, although an excess of up to about 15 percent may be employed.

In addition to the polymeric components and the cross-linking agent set forth above, the composition also includes an inorganic heat stable filler, such as titanium dioxide and silicon dioxide. The proportions of the filler to the polyester polymer are between about 0.2:1 to about 0.75:1 by weight. The filler should have a pH between about 6 and about 8, preferably about 7.

An example of a two-part system as herein disclosed includes as one separate part a carboxyl-terminated polyester, with or without an organic solvent, such as toluene, in admixture with a polymer of the polyene fatty acid and a polyfunctional amine. This part may also include fillers, such as silica and titanium dioxide. The second part of the system contains the cross-linking agent. The polyalkylenamide and the polymers are preferably in solution, such as in an aromatic solvent, when used as an adhesive. These two parts are maintained separate until it is desired to cure the polymer mixture. At that time, the two parts are admixed thoroughly and the pasty liquid is then utilized immediately. With some compositions and for some purposes, sufficient curing can be effected at room temperature within a period of twenty-four hours. In some instances, warming or heating of the composition is desirable to aid in completing the cure in a shorter period of time.

Various organic solvents may be used for dissolving the polymer components and the curing agent of the present invention. These solvents include such organic compounds as the aromatic hydrocarbons, such as benzene, toluene, and xylene; the ketones, such as acetone, methyl ethyl ketone, and methyl isobutyl ketone; esters, such as methyl acetate, ethyl acetate, isopropyl acetate, butyl acetate, amyl acetate, "Cellosolve" acetate, and "Carbitol" acetate; and cyclic ethers, such as tetrahydrofuran, dioxane, tetrahydro-2-methylfuran, tetrahydropyran, trimethylene oxide, alpha-alpha-dimethylene oxide, dioxolane, 2-methyl-1,3-dioxolane, 2,6-dimethyl-tetrahydropyran, and 2,3-dimethyl-1,4-dioxane. The solvent should be sufficiently volatile that it will be easily and quickly evaporated under the environment of the bonding operation.

Various additives may be included in the above system with either the curable polymer components or with the curing agent component in addition or in substitution for the fillers above described. For example, antioxidants, such as sym-di-beta-naphthyl-paraphenylenediamine and 4,4'-dithiodimorpholine, may be employed as an additive. Acid acceptors, such as alkali carbonates and bicarbonates, may also be employed. Pigments or re-enforcing agents are often included in such compositions, such as carbon black and ferric oxide. The amounts of additive vary considerably depending on their purpose but generally are between about 0.1:1 and about 0.75:1 of additive to polyester polymer.

The amount of curing agent or cross-linking agent utilized in this system should be sufficient to complete the curing of the curable polymers. Usually an excess stoichiometric equivalent of the curing agent to the curable polymers is utilized, and this amount, of course, depends upon the number of active hydrogen sites on the curable polymers. It is preferred to utilize more than 20 percent stoichiometric excess of the curing agent, and such excess may be as much as 70 percent.

The surfaces to which the composition of the present invention is applicable as an adhesive include the synthetic resins in the form of films and textile fabrics, such as those made from nylon (diamine-dibasic acid copolymer), fiberglass, Orlon (polyacrylonitrile), Dacron (ethylene glycolterephthalic acid copolymer) acrylic copolymer, methylmethacrylate polymer, and cotton. The present adhesive also is adherent to metal surfaces, such as copper, aluminum and steel, particularly with the use of primers, such as an epoxy base or a phenolic base primer. Other surfaces to which the present composition may be applied include wood, leather, paper, synthetic rubber and cork.

When the composition of this invention is used as a protective coating, it may be coated on the surface, such as those mentioned above, or may impregnate the surface when a porous material is used, such as paper, textile fabrics and leather. Impregnation is aided by the use of a suitable solvent.

When the above composition of matter is of a putty-like consistency, it is readily adaptable for high pressure injection into grooves surrounding the fuel cavity of many aircraft fuel tank designs. The composition assures a leak-proof seal against hydrocarbon jet fuels as well as the vapor pressure developed in the tank resulting from the aerodynamic heating during flight. The cured sealant composition of this invention is inert and resists degradation by hydrocarbon fuels and long term exposure to temperatures as high as 350 to 400° F. Other uses as aircraft sealants include use in pressurized cabins, on faying surfaces and as gaskets, valve diaphragms, and O-rings.

The following examples are offered as illustrative of the invention and of the compositions and methods described therein. The specific disclosures in the examples should not be considered unnecessarily limiting to the invention.

EXAMPLE I

The following curable compositions (1) were prepared and cured by admixing therewith a polyalkylenamide (2). The quantities of each component is reported in parts by weight.

*Table I*

| Examples of Sealant Formulations: | A | B | C |
|---|---|---|---|
| 1. Diethylene glycol adipate polyester | 100 | | |
| Neopentyl glycol adipate polyester | | 100 | |
| Neopentyl glycol isosebacate polyester | | | 100 |
| Versamid 140 | 1 | 1 | 1 |
| Agerite White (symmetrical dibetanaphthyl-p-phenylenediamine) | 2 | 2 | 2 |
| Cabosil (silicon dioxide) | 10 | 10 | 10 |
| Titanox RANC (titanium dioxide) | 50 | 50 | 50 |
| 2. N,N'-bis-ethylenisosebacamide | 12–15 | 14–17 | 12–15 |

The diethylene glycol adipate polyester had an average molecular weight of 2000–2700, an acid number of 52.0–56.0 and a specific gravity of 1.16–1.18. The neopentyl glycol adipate polyester had an average molecular weight of 1400–2000, an acid number of 58.0–62.0, and a specific gravity of 1.11–1.13. The neopentyl glycol isosebacate polyester had an average molecular weight of 1400–1900, an acid number of 48.0–52.0 and a specific gravity of 1.06–1.08. The above polyester polymers have been precured with an amount of trimethylolpropane equivalent to one-half cross-link per active hydrogen (carboxyl and hydroxyl group).

The above compositions were tested for physical properties as a sealant and compared with a conventional polysulfide sealant. The present compositions were superior to the polysulfide sealant. The data is shown below in Table II. The JP-4RF is a jet fuel composed of about 60 volume percent cyclohexane, 30 volume percent toluene, and about 10 volume percent isooctane.

Table II

| Test | A | B | C | Polysulfide Sealant |
|---|---|---|---|---|
| T., p.s.i.—24 days R.T. Cure | 610 | 560 | 565 | 365. |
| Elon. at B.[1]—24 days R.T. Cure | 525 | 365 | 315 | 160. |
| T., p.s.i.—7 day Aged @ 350° F | 555 | 525 | 645 | Too Brittle To Test. |
| Elon. at B.—7 Day Aged @ 350° F | 180 | 155 | 230 |  |
| T., p.s.i.—7 Day Aged @ 275° F | 585 | 460 | 735 | 425. |
| Elon. at B.—7 Day Aged @ 275° F | 210 | 125 | 175 | 125. |
| T., p.s.i.—14 Day Aged @ 275° F | 590 | 815 | 520 | 500. |
| Elon. at B.—14 Day Aged @ 275° F | 295 | 210 | 165 | 65. |
| T., p.s.i.—3 day in JP-4RF+ 3 Days @ 120° F.+7 Days @ 350° F | 525 | 505 | 515 | 390. |
| Elon. at B.—3 Day in JP-4RF+3 Days @ 120° F. +7 Days @ 350° F | 200 | 185 | 170 | 95. |
| Percent Wt. Loss, 9 days—JP-4RF @ 140° F.+3 days @ 120°F | 4.2 | 5.3 | 7.3 | 12.8. |
| ⅛″ Mandrel Bend after Percent Wt. Loss Test | Pass | Pass | Pass | Fails. |
| Percent Volume Swell—5 days in JP-4FR @ 120° F | 17.0 | 44.0 | 83.8 | 20.6. |
| Sp. Gravity | 1.38 | 1.32 | 1.33 | 1.44. |
| Shore $A^2$ Hardness—24 days R.T. Cure | 55 | 32 | 43 | 62. |
| Shore $A^2$ Hardness—7 days @ 350° F | 52 | 45 | 41 | Brittle. |
| Shore $A^2$ Hardness—7 days @ 275° F | 50 | 53 | 51 | 70. |
| Shore $A^2$ Hardness—14 days @ 275° F | 48 | 50 | 53 | 75. |
| Shore $A^2$ Hardness—14 days in JP-4RF @ 140° F | 50 | 35 | 38 | 31. |
| Cure Time—Tack Free, Days | 4 | 6 | 11 | 1.5. |

[1] Elon. at B. is elongation at break in percent.

EXAMPLE II

Similar formulations as in Example I were made up and tested using varying amounts of Versamid 140 (an amide-containing polyfunctional amine). The results of physical tests on such compositions are shown below in Table III. The acid members of the polyesters were, respectively, 53.4, 60.8 and 48.8.

As is seen from Table III hydrolytic resistance or stability was directly proportional to the Versamid 140 concentration. On the other hand, elongation was inversely proportional to the amount of Versamid 140 added. The percent change in tensile and elongation between unexposed and exposed samples generally indicates a better retention of these properties imparted by the Versamid. It was concluded, therefore, that an ideal sealant could be achieved by a proper amount of amide-containing polyfunctional amine, this amount generally being between about 1 and about 5 weight percent based on polyester polymer. If adhesive or coating properties are required up to about 10 weight percent or higher, amide-containing polyfunctional amine may be used. The use of the polyfunctional amine assures superior hydrolytic properties and increased tack free time to the composition.

O-rings have been made with the sealant composition of this invention such as the formulations in Table I. Such O-rings which have been made are 2 inches in diameter and ⅛ inch thick. These O-rings are fuel resistant and thermally stable and have considerable resiliency making them good seals and gasket material.

Another use of the composition of the present invention is as an interlining in windshields. For example, a 2 by 3 foot windshield was made by laminating two pieces of ¼ inch glass with a paste made up of the formulations of Table I which is placed between the glass at a thickness of about 1/16 of an inch. The glass containing the interlayer is then oven cured. The glass is shatter resistant and clearly transparent.

Another use of the composition of the present invention is as an electrical encapsulating composition or as an electrical potting composition. Copper wire encapsulated with a cured composition comprising neopentyl glycol adipate polyester with about 2 percent Versamid 140 and cured with N,N′-bis-isophthalamide showed good electrical insulating properties on the surface thereof.

Other uses of the composition of this invention include its use as an adhesive for adhering abrasive materials to paper or cloth, for saturating paper or cloth to make the substrate oil and water resistant, as expansion joints on highways and runways where extreme changes in temperature are encountered, as caulking compounds for concrete and wood, and as a sealant for natural gas pipelines, for example, sealant in bell and spigot joints.

Various modifications in the variation of the proportion of ingredients and fillers may be employed in the composition of this invention in the general teachings thereof without departing from the scope of the invention.

Having described my invention, I claim:

A process which comprises curing at a temperature

Table III

| | D | E | F | G | H | I | J | K | L | M | N | O |
|---|---|---|---|---|---|---|---|---|---|---|---|---|
| Diethylene glycol adipate polyester | 100 | 100 | 100 | 100 | | | | | | | | |
| Neopentyl glycol adipate polyester | | | | | 100 | 100 | 100 | 100 | | | | |
| Neopentyl glycol isosebacate polyester | | | | | | | | | 100 | 100 | 100 | 100 |
| Versamid 140 | 0 | 1.0 | 2.5 | 5.0 | 0 | 1.0 | 2.5 | 5.0 | 0 | 1.0 | 2.5 | 5.0 |
| Agerite White (symmetrical dibeta-naphthyl-p-phenylenediamine) | 2 | 2 | 2 | 2 | 2 | 2 | 2 | 2 | 2 | 2 | 2 | 2 |
| Cabosil (silicon dioxide) | 10 | 10 | 10 | 10 | 10 | 10 | 10 | 10 | 10 | 10 | 10 | 10 |
| Titanox RANC (titanium dioxide) | 50 | 50 | 50 | 50 | 50 | 50 | 50 | 50 | 50 | 50 | 50 | 50 |
| N,N′-bis-ethylenisosebacamide—30.6% Ring Content, 70% excess (pts./100 base polyester) | 14.2 | 14.1 | 14.0 | 13.8 | 16.2 | 16.1 | 16.0 | 15.7 | 13.1 | 13.0 | 12.8 | 12.6 |
| T., p.s.i.—Original, 28 day cure | 625 | 610 | 535 | 480 | 605 | 560 | 545 | 430 | 585 | 565 | 385 | 370 |
| Elon. at B.[1]—Original, 28 day cure | 280 | 275 | 280 | 155 | 345 | 340 | 300 | 220 | 380 | 315 | 305 | 200 |
| T., p.s.i.—7 days @ 350° F | 355 | 345 | 340 | 375 | 445 | 500 | 505 | 365 | 230 | 240 | 260 | 250 |
| Elon. at B.—7 days @ 350° F | 205 | 190 | 155 | 110 | 225 | 220 | 225 | 160 | 315 | 305 | 285 | 165 |
| T., p.s.i.—14 days, JP-4RF @ 140° F | 415 | 385 | 390 | 340 | 220 | 200 | 225 | 185 | 110 | 110 | 120 | 125 |
| Elon. at B.—14 days, JP-4RF @ 140° F | 190 | 165 | 125 | 80 | 160 | 140 | 130 | 80 | 115 | 105 | 105 | 85 |
| Shore $A_2$ Hardness—Original | 51 | 52 | 53 | 62 | 40 | 41 | 40 | 46 | 37 | 38 | 38 | 45 |
| Shore $A_2$ Hardness—7 da. @ 350° F | 36 | 40 | 45 | 52 | 29 | 36 | 39 | 46 | 26 | 23 | 19 | 30 |
| Shore $A_2$ Hardness—14 da. JP-4RF @ 140° F | 47 | 51 | 54 | 60 | 35 | 38 | 41 | 45 | 25 | 26 | 29 | 38 |
| Hydrolytic Stability—Change in $A_2$ Hardness after 27 hours in Boiling $H_2O$ | [2] −38 | [2] −39 | [2] −29 | −34 | −25 | −15 | −12 | −8 | −11 | −9 | +2 | 0 |
| Flow—inches/5 minutes @ R.T. | ⅜ | 3/16 | 3/16 | ⅛ | 3¾ | [3] 4 | [4] 4 | [3] 4 | ¼ | [5] 4 | [3] 4 | [3] 4 |
| Tack Free Time—Order | 4 | 3 | 2 | 1 | 8 | 7 | 6 | 5 | 12 | 11 | 10 | 9 |

[1] Elon. at B. is elongation at break in percent.  [2] 22 hours.  [3] ½ min.  [4] 1 min.  [5] 2½ min.

below 100° C. an admixture of an aliphatically saturated polyester polymer containing a plurality of active hydrogens selected from the group consisting of hydroxyl groups and carboxyl groups and having a molecular weight between about 1000 and about 5000 prepared from a mixture containing at least one compound of the group consisting of an alcohol and an acid having at least three functional groups, and a liquid aliphatic polymer containing at least two amine groups prepared from a polyene fatty acid and a polyfunctional amine and having a molecular weight between about 500 and about 15,000 with a polyalkylenamide represented by the following formula:

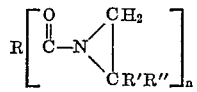

wherein R is an $n$-valent organic radical having 4 to about 55 carbon atoms, and R′ and R″ are selected from the group consisting of hydrogen, a substituted alkyl radical and a non-substituted alkyl radical, and $n$ is 2 to 4, to produce a cured product.

References Cited in the file of this patent

UNITED STATES PATENTS

| | | |
|---|---|---|
| 2,296,226 | Ulrich | Sept. 15, 1942 |
| 2,889,292 | Peerman | June 2, 1959 |
| 2,932,623 | Glaser et al. | Apr. 12, 1960 |
| 2,933,416 | Haakh et al. | Apr. 19, 1960 |

FOREIGN PATENTS

| | | |
|---|---|---|
| 900,137 | Germany | Dec. 21, 1953 |